US009043670B2

(12) United States Patent
Sayadi et al.

(10) Patent No.: US 9,043,670 B2
(45) Date of Patent: May 26, 2015

(54) METHOD FOR TRANSMITTING DATA FROM AN INFRASTRUCTURE OF A RADIO COMMUNICATION NETWORK TO USER DEVICES, AND DEVICES FOR IMPLEMENTING THE METHOD (75) Inventors: Bessem Sayadi, Nozay (FR); Laurent Roullet, Velizy (FR)

(73) Assignee: Alcatel Lucent, Boulogne-Billancourt (FR)

( * ) Notice: Subject to any disclaimer, the term of this patent is extended or adjusted under 35 U.S.C. 154(b) by 1253 days.

(21) Appl. No.: 12/746,223

(22) PCT Filed: Nov. 13, 2008

(86) PCT No.: PCT/FR2008/052044
§ 371 (c)(1),
(2), (4) Date: Sep. 29, 2010

(87) PCT Pub. No.: WO2009/071781
PCT Pub. Date: Jun. 11, 2009

(65) Prior Publication Data
US 2011/0131614 A1 Jun. 2, 2011

(30) Foreign Application Priority Data
Dec. 5, 2007 (FR) .................................. 07 59591

(51) Int. Cl.
H03M 13/00 (2006.01)
H04L 1/02 (2006.01)
H04H 20/33 (2008.01)
H04H 20/42 (2008.01)
(Continued)

(52) U.S. Cl.
CPC ................. *H04L 1/02* (2013.01); *H04H 20/33* (2013.01); *H04H 20/42* (2013.01); *H04H 20/72* (2013.01); *H04H 60/12* (2013.01); *H04L 1/0057* (2013.01); *H04L 2001/0093* (2013.01)

(58) Field of Classification Search
CPC ... H03M 13/1165; H04B 7/185; H04B 15/00; H04L 2012/5608; H04L 2012/6421; H04L 1/02; H04L 1/0057; H04L 2001/0093; H04N 7/16; H04N 7/20; H04N 21/64315; H04N 21/4385; H04N 21/434; H04H 40/00; H04H 20/86; H04H 20/33; H04H 20/42
See application file for complete search history.

(56) References Cited
U.S. PATENT DOCUMENTS
2003/0200499 A1* 10/2003 Khayrallah .................... 714/776
2004/0081103 A1* 4/2004 Sebire .......................... 370/253
(Continued)

OTHER PUBLICATIONS
Mugen Peng Wenbowang: "A Unified Architecture and Key Techniques for Interworking between WiMAX and Beyond 3G/4G Systems," Wireless Pers Commun, XP002497707, pp. 67-90, (Oct. 2, 2007).*
(Continued)

*Primary Examiner* — Albert Decady
*Assistant Examiner* — Enamul M Kabir
(74) *Attorney, Agent, or Firm* — Fay Sharpe LLP (57) ABSTRACT
Within a radio communication network infrastructure transmitting data organized into a sequence of symbols to a receiving device over a plurality of radio links, data to be transmitted is encoded according to an error correction coding scheme in order to produce a set of systematic symbols and a set of corresponding redundancy symbols; the systematic symbols and a first subset of the corresponding redundancy symbols are transmitted, over a first radio link among said plurality of radio links, in broadcast mode, and a second subset of the corresponding redundancy symbols, distinct from the first one, is transmitted over a second radio link among said plurality of radio links.

35 Claims, 6 Drawing Sheets (51) Int. Cl.
*H04H 20/72* (2008.01)
*H04H 60/12* (2008.01)
*H04L 1/00* (2006.01)

(56) References Cited

U.S. PATENT DOCUMENTS

2008/0070518 A1* 3/2008 Shinozaki .................. 455/101
2008/0134276 A1* 6/2008 Orrell et al. ................ 725/132

OTHER PUBLICATIONS

Mugen Peng Wenbowang: "A Unified Architecture and Key Techniques for Interworking between WiMAX and Beyond 3G/4G Systems," Wireless Pers Commun, XP002497707, pp. 67, 69 and 77-78, (Oct. 2, 2007).

Christoph Hausl et al.: "Relay communication with hierarchical modulation," IEEE Communications Letters, IEEE Service Center, Piscataway, NJ, US, vol. 10, No. 1, XP011171862, pp. 64-66, (Jan. 1, 2007).

Aurelian Bria: "Future Hybrid Cellular-Broadcasting Systems for Multimedia Multicasting," Computing in the Global Information Technology, 2006, ICCGI 2006, International Multi-Conference on Bucharest, Romania Aug. 1-3, 2006, Piscataway, NY, USA, IEEE, XP 031056586, pp. 18-18, (Jul. 1, 2007).

International Search Report.

* cited by examiner

FIG_1

FIG_2

FIG_5

FIG_3

FIG_7

METHOD FOR TRANSMITTING DATA FROM AN INFRASTRUCTURE OF A RADIO COMMUNICATION NETWORK TO USER DEVICES, AND DEVICES FOR IMPLEMENTING THE METHOD

The invention pertains to a method for transmitting data from an infrastructure of a radio communication network to user devices, as well as devices for implementing the method.

It may advantageously apply in the context of broadcasting multimedia content, such as video, to user devices. DVB ("Digital Video Broadcasting") systems, standardized by the ETSI, are examples of such broadcast systems. DVB-H and DVB-SH systems, currently in the process of specification, will complement the features of the terrestrial broadcasting system DVB-T by offering the ability to broadcast multimedia content to mobile terminals. The DVB-T and DVB-H systems are described in the documents ETSI TR 101,190 v1.2.1, entitled "Digital Video Broadcasting (DVB); Implementation guidelines for DVB terrestrial services; Transmission aspects", published by the ETSI in November 2004, and ETSI EN 302,304 v1.1.1, entitled "Digital Video Broadcasting (DVB); Transmission System for Handheld Terminals (DVB-H)", published by the ETSI in November 2004, respectively, to which one may refer.

Within the scope of transmitting multimedia content to mobiles, offering a satisfactory quality of service perceived by the user (a satisfactory visual quality, a low service interruption rate) remains the primary difficulty for broadcast service operators. The phenomena of fading, which every signal transmitted over an air-interface propagation channel undergoes, causes a degradation in the quality of the received signal, which the channel-encoding techniques commonly employed into digital radio communication systems are somewhat able to protect against.

The channel-encoding techniques conventionally comprise one or more steps of encoding in order to protect data to be transmitted from transmission errors, and one or more steps of interlacing the encoded feeds so as to ensure that a transmission error assigns symbols distributed across a given set instead of assigning an adjacent group of symbols. The encoding is done using an error-correction code (known as FEC, for "Forward Error Protection"), such as a Reed-Solomon code or any other block-encoding technique.

Error correction coding makes it possible both to ensure for the broadcasting of video signals an optimal signal quality for the end user and to reduce if not eliminate service interruptions caused by fading holes.

Reed-Solomon codes are an example of block codes used for error-correction coding in data transmission systems. Block codes are characterized by the fact that the error-correction code is calculated for a block, segment, or frame of data of a predetermined length. A Reed-Solomon code is commonly designated by a pair of parameters (n,k) in which n corresponds to the size in symbols (a symbol typically being a byte of 8 bits) in the codeword, and k corresponds to the size of data block to be encoded, so that a codeword whose size is n symbols corresponds to k data symbols and n−k redundancy symbols (also known as parity symbols). The k/n ratio corresponds to the Reed-Solomon code's encoding rate. The maximum amount of symbol errors which may be corrected by a Reed-Solomon code (n,k) is given by the ratio (n−k)/2. The maximum number of dropped symbols which may be corrected by a Reed-Solomon code (n,k) is equal to n−k. For example, for a sequence of 100 bytes to which 10 redundancy bytes are added, the Reed-Solomon decoder may recover up to 10 lost bytes (lost owing, for example, to the fading phenomena mentioned above). The symbol loss correction capacity is measured by the ratio 1/(n−k).

The application of an error correction code to the useful data to be transmitted, however, is done at the cost of reducing the useful data transmission bit rate. In addition, this sort of transmission error protection technique does not fully immunize the transmitted data, particularly in situations where the propagation channel exhibits long fading holes which produce data losses over a long period, taking into account the correction code's capacity. Whenever the losses of data or errors observed in the received data exceed the correction capacity of the error-correction codes that are used, lost or incorrect data may be retransmitted as an alternative, for example as part of automatic repeat request (ARQ) procedures for data transmission systems that use acknowledgment mechanisms. Since current broadcast systems do not by nature offer any uplink communication channel, known as a "back channel", from the receiving terminal to the broadcast infrastructure, or a back channel whose bit rate is too low to be used to send data retransmission requests which prove effective, it has proven necessary to create an effective compromise between the degree of protection for data transmitted in broadcast mode and the corresponding loss of useful bit rate.

One main goal of the invention is to provide a solution which is more effective in that respect.

One goal of the present invention is to make it possible to combine effective protection from transmission errors while ensuring a minimal quality of service for data transmitted within a radio communication system transmitting data, particularly in broadcast mode to mobile terminals.

The invention thereby discloses a method for transmitting data from a radio communication network infrastructure to a receiving device over a plurality of radio links, said data being organized into a sequence of symbols, which method comprises a step of encoding data according to an error correction coding scheme to be transmitted in order to produce a set of systematic symbols and a set of corresponding redundancy symbols, a step of transmitting, over a first radio link among said plurality of radio links, in broadcast mode, systematic symbols and a first subset of the set of corresponding redundancy symbols, as well as a step of transmitting, over a second radio link among said plurality of radio links, distinct from the first one, a second subset of the set of corresponding redundancy symbols.

Thus, the redundancy symbols generated by the error correction encoding of data to be transmitted in broadcast mode are split into a plurality of subsets, at least two of which are transmitted over distinct radio links. Only one subset of redundancy symbols is transmitted with at least some of the systematic symbols, with a second set of redundancy symbols being transmitted over a second radio link. As a result, the use of the radio resources of the first radio link, over which the systematic symbols are transmitted, and of the first subset of redundancy symbols is optimized, other redundancy symbols, which complement those of the first subset, are transmitted to the receiving device over another radio link.

It shall be noted that the allocation of redundancy symbols to various radio links may be carried out dynamically, and particularly vary dynamically based on the radio conditions observed over the radio link over which the systematic symbols and the first subset of redundancy symbols are transmitted.

Furthermore, as other redundancy symbols are transmitted over another radio link, they concordantly benefit from a diversity of transmission, making it possible to ensure propagation conditions different from the ones observed for the systematic symbols and the first subset of redundancy symbols.

In one particular embodiment of the invention, the transmission of the second subset of the set of corresponding redundancy symbols over the second radio link is carried out in broadcast mode.

Furthermore, the first and second subsets of redundancy symbols may be identical or distinct. They may or may not comprise elements shared by both subsets. Furthermore, they may be chosen to be complementary, such that the combination thereof constitutes the full set of corresponding redundancy symbols.

In another particular embodiment of the invention, the radio communication network infrastructure comprises a first and a second subsystem, the receiving device being capable of receiving data transmitted by the first and second subsystems, and the systematic symbols in the first subset of the set of corresponding redundancy symbols are transmitted in broadcast mode to the receiving device by the first subsystem, and the second subset of corresponding redundancy symbols is transmitted by the second subsystem.

According to this particular embodiment of the invention, the first subsystem may comprise a broadcast network infrastructure, which may, for example, be a DVB-H or DVB-SH multimedia content broadcast network infrastructure, and the second subsystem may comprise a cellular radio communication network infrastructure, which may for example be UMTS, WiMAX, CDMA2000 and/or LTE.

According to this particular embodiment of the invention, the first subsystem may further comprise a satellite-based multimedia content broadcast network infrastructure, and the second subsystem may comprise a terrestrial multimedia content broadcast network infrastructure, the satellite-based multimedia content broadcast network infrastructure and the terrestrial multimedia content broadcast network infrastructure being, for example, DVB-SH.

Furthermore, the invention may be applied with data encoding carried out according to a Reed-Solomon error correction code, or, for example, a Raptor error correction code.

The invention further discloses a receiving device configured to receive data transmitted from a radio communication network infrastructure over a plurality of radio links, said data being organized into a sequence of symbols and encoded according to an error correction code scheme in order to produce a set of systematic symbols and a set of corresponding redundancy symbols, which comprises its first means for receiving systematic symbols and a first subset of the set of corresponding redundancy symbols transmitted over a first radio link among said plurality of radio links, in broadcast mode, the second means for receiving a second subset of the set of corresponding redundancy symbols transmitted over a second radio link among said plurality of radio links, distinct from the first radio link, means for saving symbols from said second subset, and decoding means capable of decoding and correcting errors in the systematic symbols received by means of redundancy symbols of the first subset of the set of corresponding redundancy symbols, said decoding means being further capable of decoding and correcting the errors in the systematic symbols received by means of redundancy symbols from the second subset of corresponding redundancy symbols.

The decoding means may further be configured to determine whether the systematic symbols require additional correction after decoding and correcting the errors by means of redundancy symbols from the first subset of the set of corresponding redundancy symbols, and triggering the decoding and correction of errors in the systematic symbols received by means of redundancy symbols from the second subset of corresponding redundancy symbols whenever the decoding and correcting of errors in the systematic symbols received by means of redundancy symbols from the first subset of the set of corresponding redundancy symbols.

Furthermore, the second means for receiving a second subset of the set of corresponding redundancy symbols transmitted over a second radio link among said plurality of radio links, distinct from the first radio link, may be configured to receive said second subset of redundancy symbols whenever it is transmitted in broadcast mode.

In one particular embodiment of the invention, the receiving device is configured to receive data transmitted from a radio communication network infrastructure comprising first and second subsystems, and the first receiving means are configured to receive systematic symbols and the first subset of the set of corresponding redundancy symbols transmitted in broadcast mode by the first subsystem, while a second receiving means is configured to receive the second subset of the set of corresponding redundancy symbols transmitted by the second subsystem.

In this particular embodiment of the invention, the first receiving means may be configured to receive systematic symbols and the first subset of the set of corresponding redundancy symbols transmitted in broadcast mode by a broadcast network infrastructure, for example a DVB-H or DVB-SH multimedia content broadcast network infrastructure, and a second receiving means may be configured to receive the second subset of the set of corresponding redundancy symbols transmitted by a cellular radio communication network infrastructure, for example UMTS, WiMAX, CDMA2000 and/or LTE.

In this particular embodiment of the invention, the first receiving means may further be configured to receive systematic symbols and the first subset of the set of corresponding redundancy symbols transmitted in broadcast mode by a satellite-based multimedia content broadcast network infrastructure, and a second receiving means may also be configured to receive the second subset of the set of corresponding redundancy symbols transmitted by a terrestrial multimedia content broadcast network infrastructure, the satellite-based multimedia content broadcast network infrastructure and terrestrial multimedia content broadcast network infrastructure being, for example, DVB-SH.

The receiving device's decoding means may further be configured to decode data encoded using a Reed-Solomon error correction code, or, for example, to decode data encoded according to a Raptor error correction code.

This receiving device according to the invention may advantageously be integrated into a mobile radiocommunication station.

The invention further discloses a radio communication network infrastructure configured to transmit data to a receiving device over a plurality of radio links, said data being organized into a sequence of symbols, comprising encoding means capable of encoding according to an error correction coding scheme data to be transmitted in order to produce a set of systematic symbols and a set of corresponding redundancy symbols, first transmission means, capable of transmitting, over a first radio link among said plurality of radio links, in broadcast mode, the systematic symbols and a first subset of the set of corresponding redundancy symbols, and second transmission means, capable of transmitting, over a second radio link among said plurality of radio links, distinct from the first one, a second subset of the set of corresponding redundancy symbols.

In one particular embodiment of the invention, the second transmission means are capable of transmitting, over a second radio link among said plurality of radio links, distinct from the first one, the second subset of the set of the corresponding redundancy symbols in broadcast mode.

The inventive radio communication network infrastructure may further comprise a first subsystem comprising the first transmission means and a second subsystem comprising the second transmission means. The first subsystem may comprise a broadcast network infrastructure, for example a DVB-H or DVB-SH multimedia content broadcast network infrastructure, comprising the first transmission means, and the second subsystem may comprise a cellular radio communication network infrastructure, for example UMTS, WiMAX, CDMA2000 and/or LTE, comprising the second transmission means. The first subsystem may further comprise a satellite-based multimedia content broadcast network infrastructure comprising the first transmission means, and the second subsystem may comprise a terrestrial multimedia content broadcast network infrastructure comprising a second transmission means, the satellite-based multimedia content broadcast network infrastructure and terrestrial multimedia content broadcast network infrastructure being, for example, DVB-SH.

Furthermore, the means of encoding the radio communication network infrastructure may be configured to carry out data encoding according to a Reed-Solomon error correction code, or, to give another example, a Raptor error correction code.

The invention further discloses a radio communication network infrastructure node configured to transmit data to a receiving device over a plurality of radio links, comprising means for receiving data to be transmitted organized into a sequence of symbols, encoding means capable of encoding, according to an error correction coding scheme, data to be transmitted to produce a set of systematic symbols and a set of corresponding redundancy symbols, transmission means, configured to transmit to a first radio transmission device of the infrastructure, the systematic symbols and a first subset of the set of corresponding redundancy symbols to be transmitted over a first radio link among said plurality of radio links, in broadcast mode, said transmission means being further configured to transmit to a second radio transmission device of the infrastructure a second subset of the set of corresponding redundancy symbols to be transmitted over a second radio link among said plurality of radio links, distinct from the first one.

This inventive infrastructure node may advantageously be incorporated into a DVB-H IP encapsulator node, or in a DVB-SH Network Head End node.

The invention finally proposes a computer program that may be loaded into a memory associated with a processor, and comprising instructions for implementing a method as defined below when said program is executed by the processor, as well as a data-processing medium on which said program is stored.

Other particularities and advantages of the present invention will become apparent in the description below of non-limiting example embodiments, with reference to the appended drawings, in which.

The invention is particularly well-suited, though not exclusively so, to a DVB-SH multimedia content broadcast network, and is described below in its application to such a system. Furthermore, in what follows, it is assumed by way of a non-limiting example that the multimedia content broadcast to the user devices are videos. The invention, however, is not limited to this type of content, and in reality relates to any type of multimedia content, and particularly television or radio programs and audio content.

Figure 1:
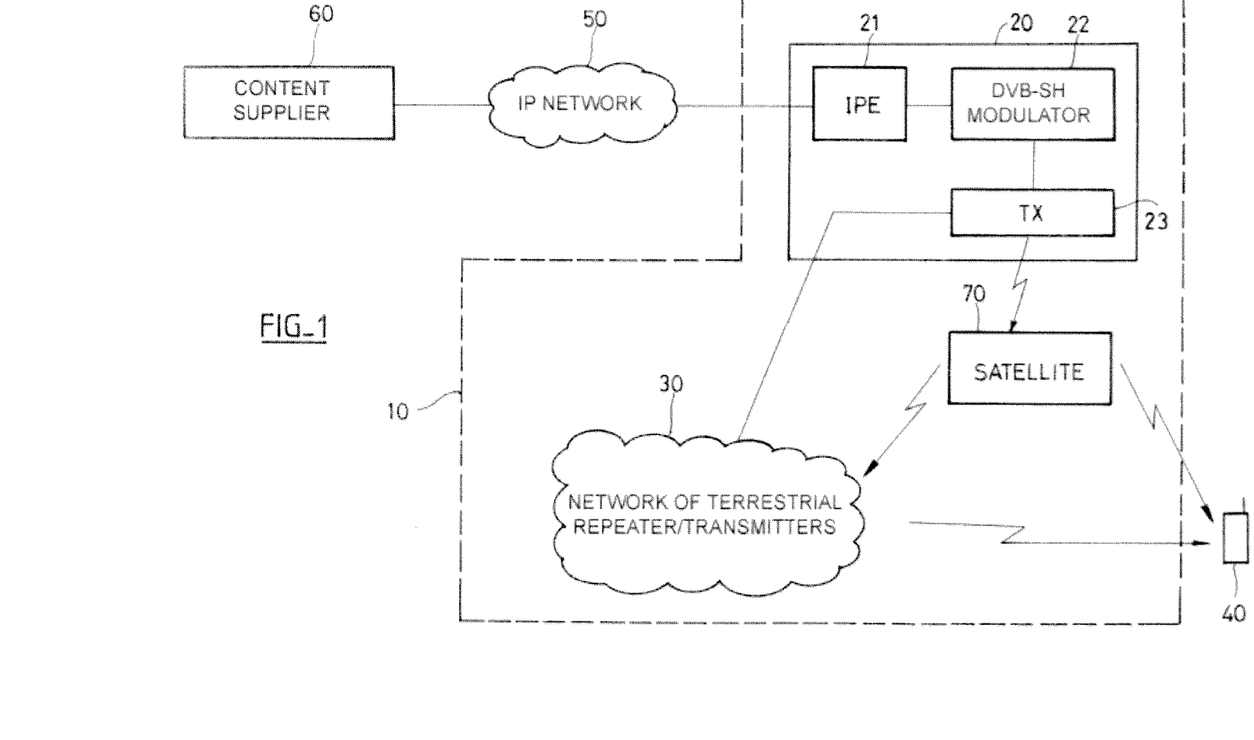
FIG. 1 shows the architecture of a hybrid multimedia content broadcast system to which the invention may advantageously apply.

This application is illustrated by FIG. 1, which shows a hybrid DVB-SH radio communication and content broadcast network infrastructure (10), meaning one that is both satellite-based and terrestrial. The network (10) is particularly well-suited to broadcasting multimedia content within the scope of providing mobile interactive multimedia services.

The multimedia content broadcast network 10 comprises an IPE ("IP Encapsulator") node 21 which transposes an input feed of IP ("Internet Protocol") datagrams transporting the multimedia content in a DVB transport feed using a so-called multiprotocol encapsulation (MPE) process. The DVB transport feed is then transmitted to the DVB-SH modulator 22, potentially after having been multiplexed with other DVB service feeds. The DVB-SH modulator 22 modulates and formats the signals received so that they may be transmitted over the air interface by the TX module 23 to the satellite equipment 70 and/or directly to the terrestrial repeaters/transmitters 30.

The satellite device 70 retransmits the signals received both over a radio link to the network of terrestrial repeaters/transmitters 30, and/or over a radio link to the user device 40. The network of terrestrial repeaters/transmitters 30 in turn retransmits the received signals to the user device 40.

Thus, some content may be transmitted directly from the satellite 70 to the user device 40 while other content may be transmitted by means of the terrestrial network of repeaters/transmitters 30.

The multimedia content broadcast network 20 is also connected to an IP network 50 by means of the IPE node 21. The multimedia content broadcast to the user devices is provided by a content-supplying node 60, which itself is also connected to the IP network 50.

The user device 40 is a DVB-SH user device, for example a DVB-SH-compatible mobile terminal. It is multi-mode, in that it is capable of receiving content from different radio interfaces, and in this situation receive content broadcast by the satellite channel and content broadcast by the terrestrial channel (the satellite and terrestrial channels using distinct frequency bands), as well as the corresponding respective signals. However, the invention is not limited to this type of user device, and may be applied to any fixed or mobile (or portable or cellular) communication device capable of receiving data transmitted by a radio communication network infrastructure transmitting data to user devices over a first radio link in broadcast mode, as well as over at least one second radio link, distinct from the first. Consequently, it may be a landline telephone, a desktop or portable computer, or a multimedia content receiver (for example a decoder, residential gateway, or STB (Set-Top Box)), provided that it is equipped with communication means, potentially terrestrial or satellite radio means, capable of communicating with a communication network infrastructure transmitting data to user devices over a first radio link in broadcast mode as well as over at least one second radio link, distinct from the first.

The transmission channel of the DVB-SH broadcast network 10 comprises elements in layers 1 and 2 of the ISO model. Layer 2 (data link layer) comprises a step of channel-encoding, which performs error correction coding (FEC, for "Forward Error Correction") encoding on data to be transmitted. This data link layer is, for example, found in the IPE mode 21.

Figure 2:
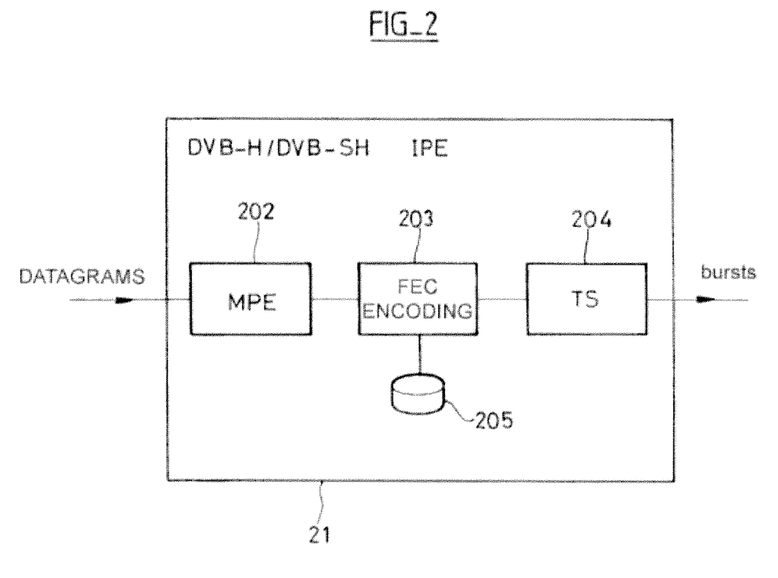
FIG. 2 is a synoptic diagram of an IPE node of a DVB-SH broadcast network infrastructure.

FIG. 2 illustrates the various functions carried out within the IPE node 21.

The incoming feed of network-layer datagrams (OSI layer 3) (it shall be assumed for the purposes of the present description that they are IP datagrams though without this being limiting) is processed by an encapsulation means, which encapsulates the IP datagrams polling within the blocks, known as MPE sections (in English, "Multi-Protocol Encapsulation sections"), according to a method described in sections 7 and 8 of the document ETSI EN 301,192, v 1.4.1, entitled "Digital Video Broadcasting (DVB); DVB specification for data broadcasting" and published by ETSI in November 2004. Each MPE section contains a header, an encapsulated IP datagram, and parity bits obtained by calculating a CRC ("Cyclic Redundancy Check") error-detection code on the IP datagram and the header. These encapsulation means correspond to the MPE module 202 in FIG. 2.

The encoding of the MPE sections is then carried out by the encoding module 203, which performs a first MPE intrasection error correction encoding producing frames known as MPE-FEC, followed by a second inter-frame MPE-FEC error correction encoding which produces frames known as MPE-OFEC (for "MPE Outer-FEC").

The transmission of the signals by the multimedia content broadcast system 10 is carried out using a time-division multiplexing (TDM) scheme in bursts, with a burst being sent over a sending time slot. This burst data sending technique particularly makes it possible to save on the power consumption of the receiving devices, which may be mobile terminals whose battery is a critical resource which should be conserved as much as possible. It is comparable to the so-called "time slicing" method, introduced in the DVB-H specifications for broadcasting video content to portable mobile terminals, for the purpose of transmitting bursts of data at a much higher bit rate than the bit rate required for transmitting multimedia content over an air interface, in order to enable the receiver (particularly a mobile terminal) to only be in active mode when receiving data during a burst, whose duration is time-limited. The TS module 204 in FIG. 2 therefore forms bursts based on the MPE-OFEC frames which it receives from the FEC encoding module 203.

Returning to FIG. 1, the bursts produced by the IPE module 21 are transmitted to the DVB-SH modulator 22 in order to be modulated and formatted in view of being transmitted by the transmission module 23 to the satellite equipment 70 and/or to the terrestrial network of repeaters/emitters.

Figure 3:
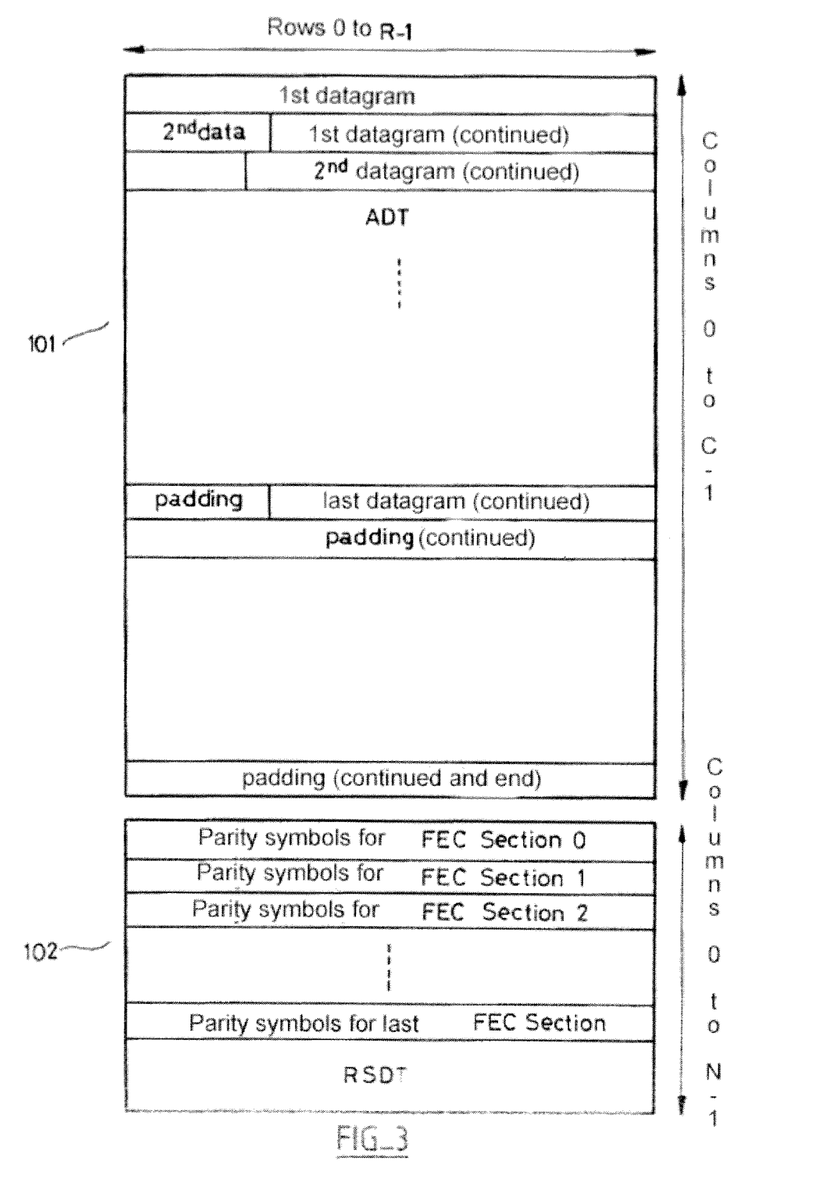
FIG. 3 illustrates the application of a first FEC encoding to a sequence of symbols within a DVB-SH broadcast network infrastructure.

FIG. 3 illustrates the application of a first FEC encoding to a sequence of symbols (in the particular example embodiment of the invention described below, it is assumed that a symbol is a binary byte) formed by a set of network-layer datagrams (OSI layer 3) transporting data to be encoded. First, a datagram burst is constructed, formed by the sequence of symbols of datagrams that make up the burst, beginning with the first symbol of the first datagram's header and finishing with the last symbol of the useful data ("payload") of the last datagram. Additionally, each datagram in the burst is assigned an address pointing to the first symbol of the datagram, which makes it possible to uniquely identify each datagram within the burst. The input sequence of the channel encoder is organized in memory according to a logical matrix of C columns depicted in FIG. 2 (C=191 for DVB-H or DVB-SH), filling up the logical matrix 101 with the symbols of a burst of datagrams column by column, as depicted in FIG. 2. In what follows, the terms "matrix" or "logical matrix" refer to a logical arrangement of data for the purposes of specific processing which does not in any way presuppose the arrangement of data within a memory when the processing is actually implemented within a device. Data to be encoded are thereby organized logically in the memory (memory 205 in FIG. 2) according to a matrix 101 known as an ADT ("Application Data Table"). The number R of ADT logic matrix rows is a parameter of the system, particularly chosen based on the length of the burst of input datagrams (R=256, 512, 768 or 1024 for DVB-SH). This logic matrix is first initialized with padding symbols, for example the null byte symbol, so that the last columns of the ADT logic matrix may be filled up with padding symbols if the size of the datagram burst is not sufficient to completely fill the ADT logic matrix. The maximum size of a burst of datagrams, going by the number of symbols, is also preferentially chosen so as not to exceed the product of C times R. Data of the ADT logical matrix 101 is encoded row by row, by calculating a vector of parity symbols for each row. One of the purposes of this matrix logical arrangement is the application of a block code to data vectors formed by the rows of the ADT logical matrix 101. The rows may be encoded using any block coding method which is known in and of itself, such as using a Reed-Solomon or LDPC encoding method. Thus, to the ADT logical matrix, a logical matrix of parity bits, known as RSDT, is added, in which every row corresponds to a vector of parity symbols resulting from encoding, such as Reed-Solomon (C+N,C)-encoding, the corresponding row in the ADT logical matrix. The number of columns in the RSDT logical matrix 102 is equal to N (N=64 for DVB-H or DVB/SH). The rows in the RSDT logical matrix 102 are also known as inner FEC, because they protect data of the ADT logical matrix 101 from transmission errors, with an error correction capacity for symbols (a symbol being, in this example, a byte) equal to Correction_capacity=N/2 (or 32 bytes for DVB-H or DVB-SH). The logical matrix combining the ADT 101 and RSDT 102 logical matrices is also called the MPE-FEC frame.

The first FEC encoding applied to the MPE sections at the output of the MPE module 202 is carried out within the FEC encoding module 203, and produces a sequence of MPE-FEC frames MPE-FEC$_k$ with the sequential index k.

Figure 4:
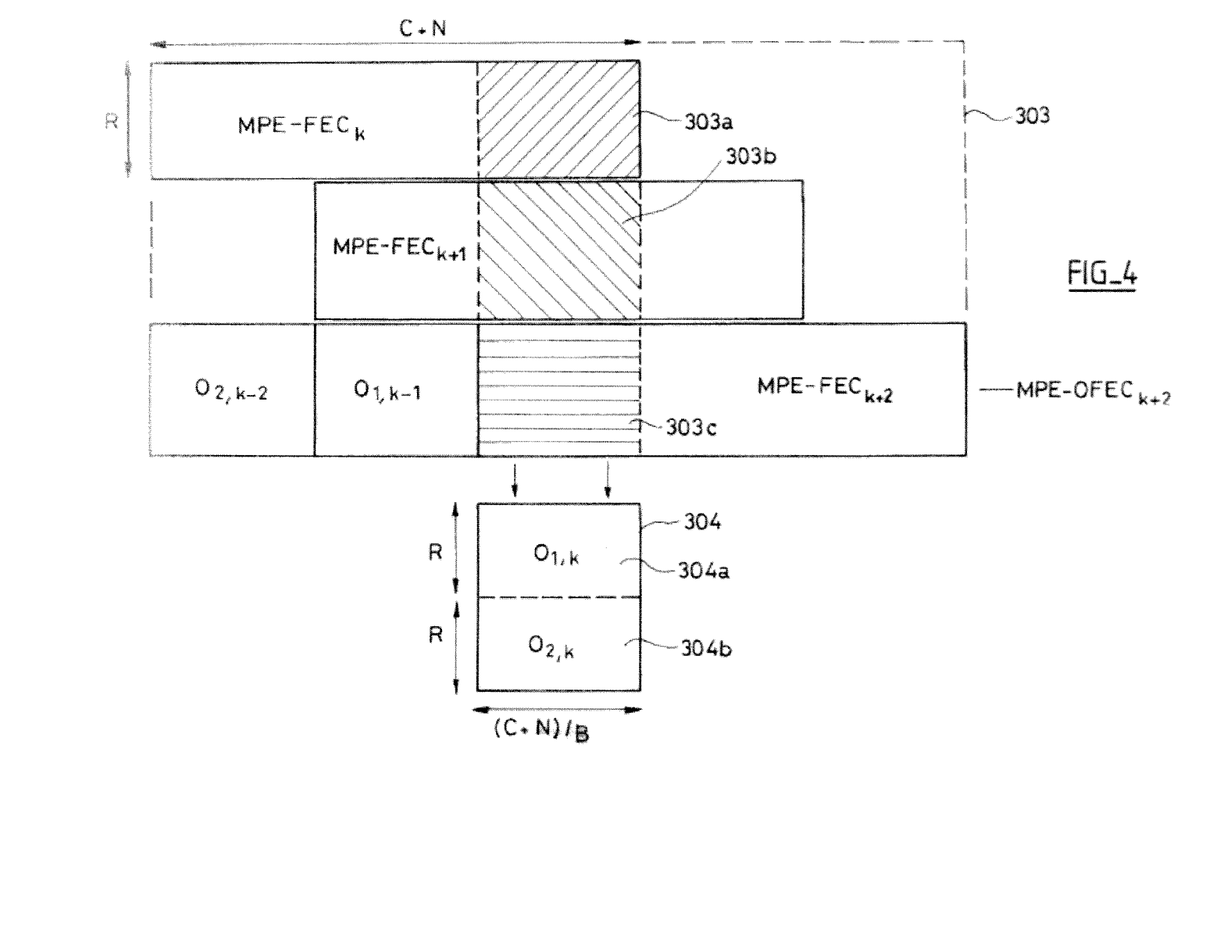
FIG. 4 illustrates the application of a second FEC encoding applied to MPE-FEC frames within a DVB-SH broadcast network infrastructure.

FIG. 4 illustrates the application of a second FEC encoding applied to the MPE-FEC frames. In the illustrated example, data of B consecutive MPE-FEC frames in the sequential order they are produced by the MPE-FEC encoding module 203 is saved (in memory 206 in FIG. 2). B is preferentially chosen from the divisors of C+N. As depicted in FIG. 4 (for which B was chosen to be equal to 3), in which data of B consecutive MPE-FEC frames are written into a block logic matrix whose dimensions are (2*B−1)*(C+N)/B columns, and B*R rows, data in every MPE-FEC frame being written while maintaining their matrix logical organization within the block matrix by applying to the frame whose sequence is j a shift of R*j rows, and a shift of (C*j)/B columns, j being a whole number from 0 to B−1, a block code may be applied to data vectors that make up the elements of the columns of B consecutive shifted MPE-FEC frames. The rows may be encoded using any block coding method which is known in and of itself, such as using a Reed-Solomon or LDPC encoding method. Thus, based on the symbols of B submatrices 303a, 303b and 303c, a parity symbol matrix 304 is calculated by applying an error correction encoding algorithm. The block 304 whose dimensions are S*R rows (in the example illustrated by FIG. 4, S is chosen to be equal to 2) and (C+N)/B columns comprise the parity symbols of the encoding of the symbols of columns of B consecutive blocks 303a, 303b, and 303c made up respectively of columns of consecutive MPE-FEC frames written within the block logic matrix 303. The columns of block 304a are also known as outer FECs, because they protect against transmission errors occurring across multiple MPE-FEC frames. Data in this block may be organized into S sub-blocks whose dimensions are R rows and (C+N)/B columns, so as to add onto an MPE-FEC frame S sub-blocks carrying the parity symbols of the B preceding MPE-FEC frames. FIG. 4 illustrates this FEC encoding mechanism with B=3 MPE-FEC frames MPE-FEC$_k$, MPE-FEC$_{k+1}$ and MPE-FEC$_{k+2}$. In this example, the integer (C+N) is chosen from among multiples of Data of the three MPE-FEC frames MPE-FEC$_k$, MPE-FEC$_{k+1}$, and MPE-FEC$_{k+2}$ are written in the block logical matrix 303 while maintaining the same logical matrix arrangement previously described, according to the diagram explained above. The block logic matrix [O$_{1,k}$;O$_{2,k}$] results from encoding the vectors made up by the columns whose rank is 1+(B−1)*(C+N)/B to C+N for the MPE-FEC frame MPE-FEC$_k$, rank 1+(C+N)/B to (B−1)*(C+N)/B for the MPE-FEC frame MPE-FEC$_{k+1}$, and rank 1 to (C+N)/B for the MPE-FEC frame MPE-FEC$_{k+2}$. The symbols of the submatrix O$_{1,k}$ and those of the submatrix O$_{2,k-1}$ are added to the MPE-FEC frame MPE-FEC$_{k+1}$, those of the submatrix O$_{1,k+}$, and those of the submatrix O$_{2,k}$ are added to the MPE-FEC frame MPE-FEC$_{k+2}$, and so on. The MPE-FEC frames to which inter-MPE-FEC-frame redundancy sub-blocks O$_{1,k+1}$ and O$_{2,k+j-1}$ are added are called MPE-OFEC frames.

This second FEC encoding of the MPE-FEC frames produced by the first encoding is carried out within the encoding module 203 in FIG. 2, in cooperation with the memory module 205. For this second encoding, the same encoding scheme may advantageously be used as for the first encoding, meaning the Reed-Solomon encoding scheme described in section 9 of the document ETSI EN 301,192. It is therefore advantageous to use the same encoding means, particularly if they are implemented in a hardware component, for "inner-FEC" encoding and "outer-FEC" encoding. The elements of the columns in blocks 303a, 303b, and 303c in the event that B is chosen to be equal to 3 may be written in an ADT data matrix in which the Reed-Solomon encoding described in section 9.5.1 of the document ETSI EN 301,192 is applied. This method, described above, makes it possible to generate up to N=64 "FEC sections" (an FEC section being constituted of the symbols of a column of the RSDT matrix generated from the error correction encoding the symbols of the ADT matrix).

According to the invention, an error correction code is applied with a coding rate making it possible to generate a set of redundancy symbols. Next, a first and second subset of the thereby generated set of redundancy symbols are determined. In this example implementation of the invention, the FEC encoding module 203 generates N FEC sections, but for transmission with the systematic data, only communicates N−COMP (COMP being chosen to be strictly less than N) to the TS module 204. Thus, the memory 205 saves COMP FEC sections which are not transmitted to the receiving device 40 with the systematic data.

For example, if data corresponding to a piece of television channel content is broadcast by the DVB-SH infrastructure 10 to the receiving devices 40 with direct reception by the satellite equipment 70, it will be transmitted with a subset of N−COMP FEC sections from among the set of N FEC sections calculated over the MPE-FEC frames in accordance with the second encoding scheme described above. This makes it possible to limit the usage of the bandwidth of the direct link between the satellite 70 and the receiving device 70 for sending redundancy information while ensuring a certain degree of protection from long fading holes that may occur over that link.

The additional redundancy information, in this situation the COMP FEC sections, are transmitted to the receiving device 40 over another radio link, for example via the terrestrial repeaters/transmitters 30 which also transmit data to the receiving device 40. According to another example embodiment of the invention, the memory 205 saves COMP FEC sections which are not transmitted to the receiving device 40 with the systematic data, as well as COMP$_1$ FEC sections which are transmitted to the receiving device 40 with the systematic data, and the COMP+COMP$_1$ FEC sections are transmitted to the receiving device 40 over another radio link, for example via the network of terrestrial repeaters/transmitters 30. According to yet another example embodiment of the invention, the memory 205 saves COMP FEC sections which are not transmitted to the receiving device 40 with the systematic data, and COMP$_2$ FEC sections among the COMP (COMP$_2$<COMP) are transmitted to the receiving device 40 over another radio link (for example, via the network of terrestrial repeaters/transmitters 30), COMP$_2$ being chosen based on the radio resources available on the other radio link.

In the example depicted in FIG. 1, this transmission of additional redundancy information, carried out via the network of terrestrial repeaters/transmitters 30, is also in broadcast mode. In this way, the receiving device 40 which encounters long fading holes over the direct link with a satellite equipment 70 which generate data losses that may not be recovered by the redundancy information transmitted with data to be transmitted, may recover the additional redundancy information transmitted via the network of terrestrial repeaters/transmitters 30, in order to attempt to correct the reception errors.

The signaling of the additional redundancy information transmitted over the other radio link may, for example, comply with the SDP ("Session Description Protocol") defined by the IETF in the RFC2327 published by the IETF in April 1998. This additional redundancy information may be transmitted with identification information of the content feed carried by the systematic symbols to which they correspond. This identification information may, for example, consist of a feed identification IP address or feed broadcast session identification. This enables the receiving equipment 40 to associate the additional redundancy information received over the other radio link with the systematic symbols and the first subset of redundancy symbols to which they correspond.

Figure 5:
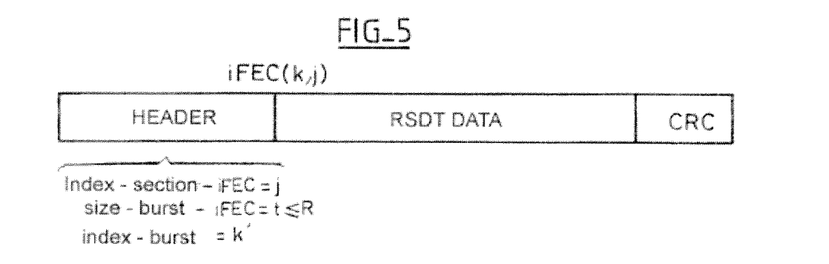
FIG. 5 is a synoptic diagram of an iFEC section generated by an IPE node of a DVB-SH broadcast network infrastructure in one particular embodiment of the invention.

In order to inform the receiving equipment 40 that it may seek to obtain additional redundancy information over another radio link, the encoding module 203 of the IPE 21 constitutes, based on the FEC sections generated by encoding the MPE-FEC frames, sections known as "iFEC" (or "iFEC sections"). The structure of an iFEC section is illustrated in FIG. 5. An iFEC section comprises a header, a data portion ("payload") made up of symbols of one or more FEC sections, as well as the parity bits obtained by calculating a CRC ("Cyclic Redundancy Check") error correction code on data and the header. As many iFEC sections may be constructed as there are FEC sections generated for the systematic symbols of an ADT matrix. The set of iFEC sections transmitted within a burst, and therefore not corresponding to additional redundancy information, constitutes an iFEC burst. Each iFEC burst comprises a maximum number R of iFEC sections indicated in the header of each iFEC. Additionally, each iFEC section comprises within its header an index number j=0 . . . R−1 uniquely identifying it within the set of R possible iFEC sections of a burst. Finally, every iFEC section carries within its header an iFEC burst index k', which corresponds to data burst index k to which the iFEC burst corresponds.

Thus, whenever the user device 40 receives an iFEC burst comprising R-COMP iFEC sections, each iFEC section carrying an indication in its header that an iFEC burst may carry up to R iFEC sections, it may deduce therefrom that complementary iFEC sections (at most COMP) were transmitted over another radio link besides the one over which it received the R-COMP iFEC sections. Another possibility, without departing from the scope of the invention, consists of inserting the number of iFEC sections contained within the iFEC burst in the header of each of the burst's iFEC sections. The processing of the header of the additional iFEC sections received over another radio link makes it possible, by the index j of iFEC sections and the burst index k, to associate them with the iFEC sections that they just completed.

This type of signaling regarding whether or not additional redundancy information transmitted over another radio link is present may, alternatively or in addition, be advantageously carried out by means of information on the actual coding rate with which the set of redundancy information was generated. This information may also be carried by the header of the iFEC sections. Comparison of this information with the number of iFEC sections received within an iFEC burst, given the length of the sequence of systematic symbols that are encoded, may enable the terminal to deduce the presence of additional redundancy information. Alternatively, information on the actual coding rate may also be transmitted, meaning the rate which corresponds to the number of redundancy symbols actually generated, as well as information on the reported coding rate, meaning the rate which corresponds to the number of redundancy symbols transmitted with the systematic symbols.

Figure 6:
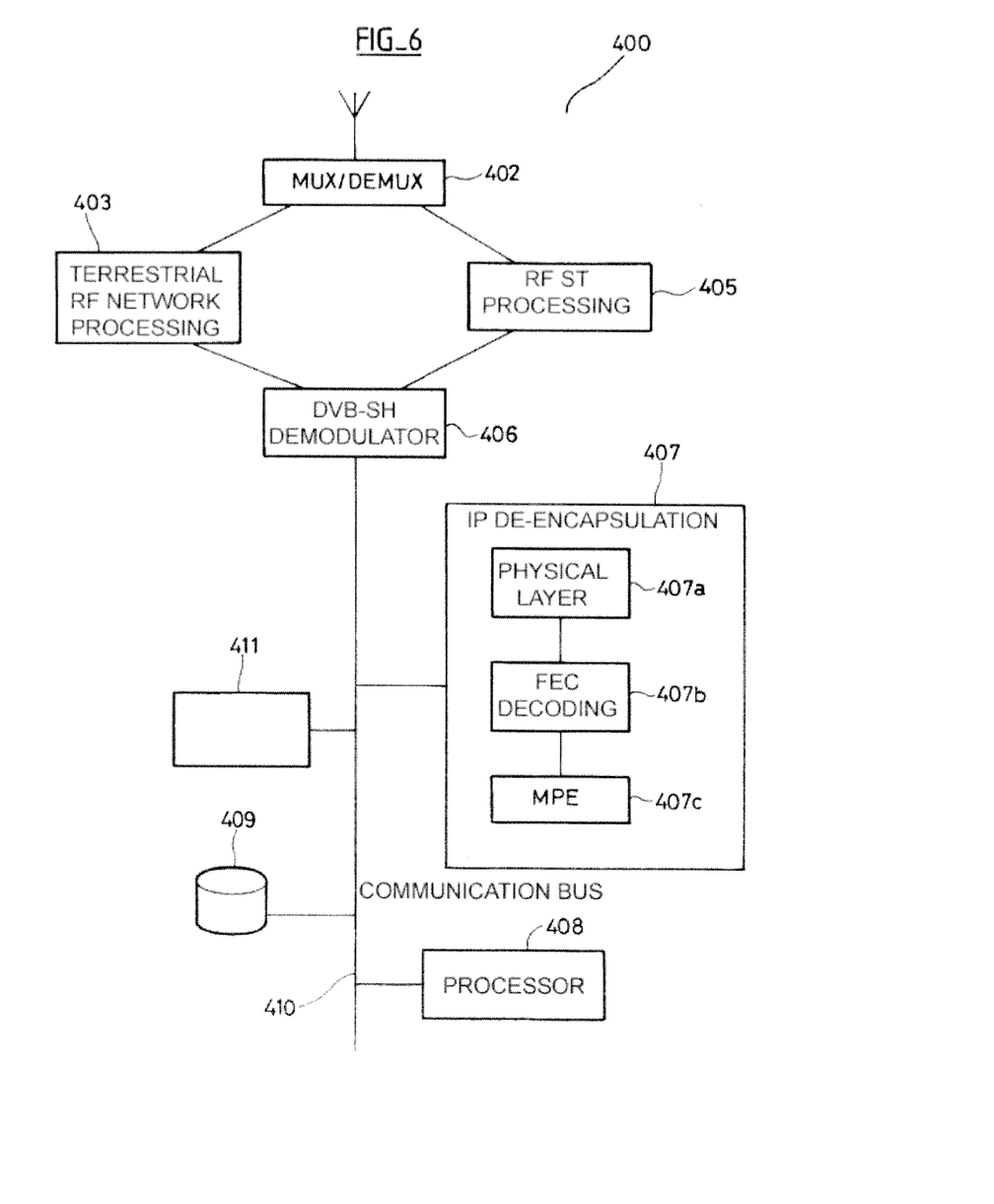
FIG. 6 is a synoptic diagram of a user device implementing the present invention according to one particular embodiment.

FIG. 6 is a synoptic diagram of a user device implementing the present invention according to a particular embodiment described below.

The user device 400 depicted in FIG. 6 comprises means 402 for multiplexing/de-multiplexing the signals received via the antenna means 401 both of the satellite 70 and of the network of terrestrial repeaters/transmitters 30. The means 402 for multiplexing/de-multiplexing transmit the signals received from a satellite to the satellite reception RF processing means 404, and the signals received from the network of terrestrial repeaters/transmitters 30 to the terrestrial repeater/transmitter network's means 403 for reception RF processing. The radio processing means 403, 405 together carry out radio processing on the bursts received from the network of terrestrial repeaters/transmitters 30 or from the satellite, respectively, at the antenna means 401, and transmit to the DVB-SH demodulation means 406 the signals received transporting the bursts. The demodulation means 406 transmit to the IP de-encapsulation means 407 bursts of data after demodulating the received signals carrying the bursts. The demodulation means 406, de-encapsulation means 407, memory means 409, and processor means are connected to an internal communication bus 410. The IP de-encapsulation means 407 are tasked with processing layers 1 (physical layer) and 2 (data link layer), and comprise time slicing processing means 407a which reconstruct a continuous feed of received data from the received bursts, and channel decoding means 407b.

The physical layer processing means 407a process the demodulated signals carrying the bursts received from demodulation means 406 in order to produce a sequence of MPE-OFEC frames. They also process the demodulated signals carrying the additional iFEC sections received from the demodulation means 406 and save these additional received sections in memory 409 at an address communicated to the channel decoding means 407b, or, alternatively, directly transmit these additional sections to the channel decoding means 407b. The MPE-OFEC frames received from the physical layer processing means 407a are saved in memory 409 in order to be processed later by the channel decoding means 407b in order to determine whether they were or were not correctly received. If an MPE-OFEC frame is correctly received and a decoded MPE section was produced, data from the MPE section carrying the multimedia content is transmitted to the means 411 for playing the multimedia content, such as by means of an internal data transmission bus 410, potentially by way of the memory 409. If the MPE-OFEC frame is not correctly received, it may potentially be retrieved or corrected using redundancy information carried by the following and/or preceding MPE-OFEC frames, up to the limit of the correction capacity of this redundancy information. Additionally, the decoding means analyze the signaling information accompanying the received redundancy information in order to determine whether additional redundancy information was transmitted over another radio link. If it was, the FEC decoding means recover the additional redundancy information in order to repeat the decoding process with all of the redundancy information received over the various radio links.

Figure 7:
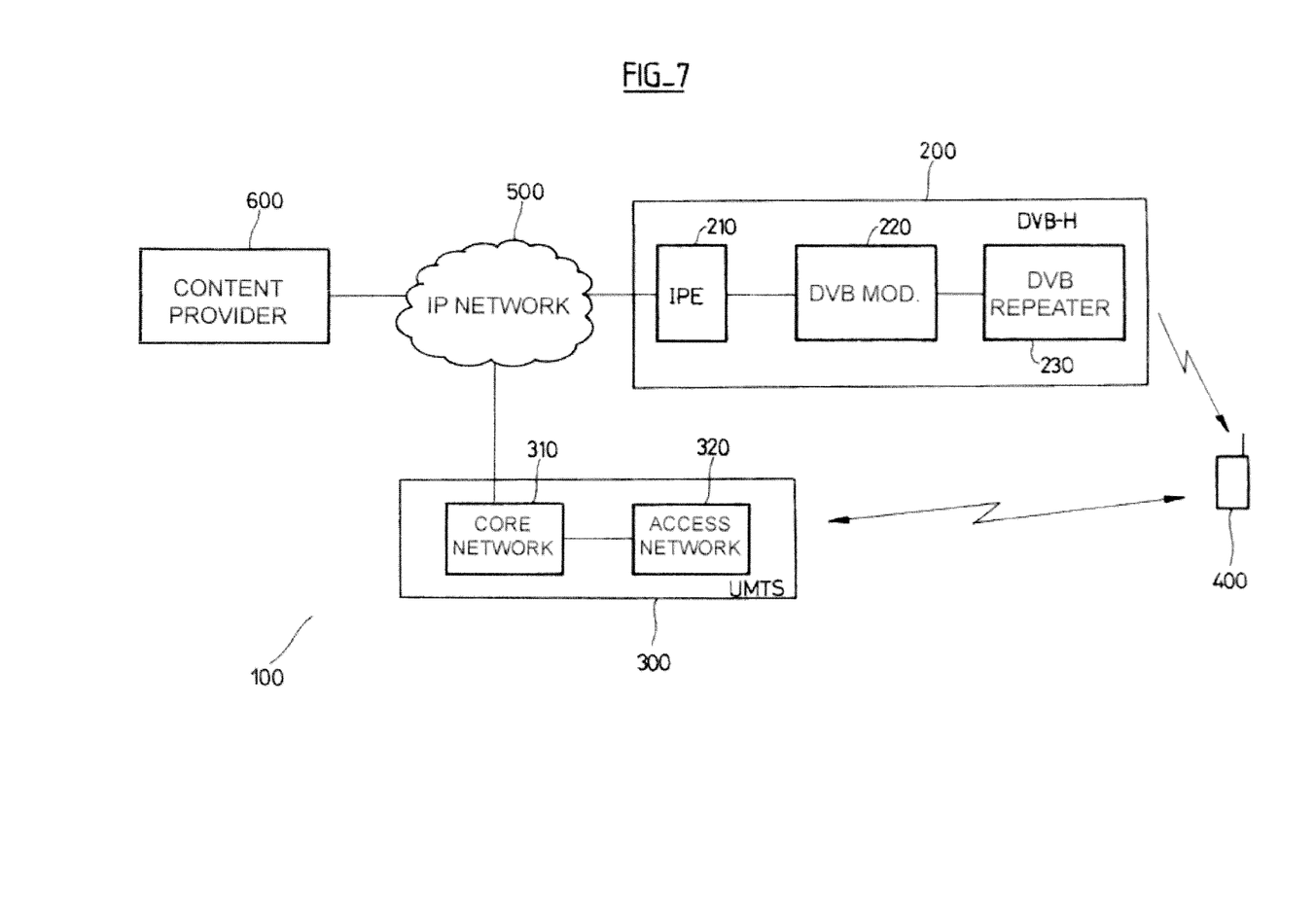
FIG. 7 shows the architecture of a hybrid multimedia content broadcast system transmitting multimedia content to which the invention may advantageously apply.

FIG. 7 shows a hybrid multimedia content broadcast system (100). The multimedia content broadcast system (100) includes a distribution network (200), which comprises an IPE ("IP Encapsulator") node (210), an DVB-SH modulator (220), and a DVB repeater (230). The multimedia content broadcast system (100) also includes a UMTS network (300), which comprises a core network (310) and an access network (320), and a DVB-SH user device (400), which communicates with the distribution network (200) and to the UMTS network (300). The multimedia content broadcast system (100) further includes an IP network (500), which is connected to the distribution network (200) and to the UMTS network (300), and a content provider (600), which is connected to the IP network (500).

The invention claimed is:

1. A method for transmitting data from a radio communication network infrastructure to a receiving device over a plurality of radio links, said data being organized into a sequence of symbols, the method comprising:
encoding, according to an error correction coding scheme, data to be transmitted in order to produce a set of systematic symbols and a set of corresponding redundancy symbols;
transmitting, over a first radio link among said plurality of radio links, in broadcast mode, systematic symbols and a first subset of the set of corresponding redundancy symbols;

transmitting, over a second radio link among said plurality of radio links, distinct from the first one, a second subset of the set of corresponding redundancy symbols, wherein the radio communication network infrastructure comprises a first and a second subsystem, and the systematic symbols in the first subset of the set of corresponding redundancy symbols are transmitted in broadcast mode to the receiving device by the first subsystem, and the second subset of corresponding redundancy symbols is transmitted by the second subsystem.

2. A method according to claim 1, wherein the transmission over a second radio link among said plurality of radio links of a second subset of the set of corresponding redundancy symbols is carried out in broadcast mode.

3. A method according to claim 1, wherein the first and second subsets of redundancy symbols are distinct.

4. A method according to claim 1, wherein the first and second subsets of corresponding redundancy symbols are chosen to be complementary so that combining them comprises the full set of corresponding redundancy symbols.

5. A method according to claim 1, wherein the first subsystem comprises a broadcast network infrastructure, and the second subsystem comprises a cellular radio communication network infrastructure.

6. A method according to claim 5, wherein the broadcast network infrastructure is a DVB-H or DVB-SH multimedia content broadcast network infrastructure, and the cellular radio communication network infrastructure is of the UMTS, WiMAX, CDMA2000 and/or LTE type.

7. A method according to claim 1, wherein the first subsystem comprises a satellite-based multimedia content broadcast network infrastructure, and the second subsystem comprises a terrestrial multimedia content broadcast network infrastructure.

8. A method according to claim 7, wherein the satellite-based multimedia content broadcast network infrastructure and the multimedia content broadcast network infrastructure are of the DVB-SH type.

9. A method according to claim 1, wherein the encoding of data is carried out using a Reed-Solomon error correction code.

10. A method according to claim 1, wherein the encoding of data is carried out using a Raptor error correction code.

11. A receiving device configured to receive data transmitted from a radio communication network infrastructure over a plurality of radio links, said data being organized into a sequence of symbols and encoded according to an error correction code scheme in order to produce a set of systematic symbols and a set of corresponding redundancy symbols, wherein the receiving device is further configured to:

receive systematic symbols and a first subset of the set of corresponding redundancy symbols transmitted over a first radio link among said plurality of radio links, in broadcast mode;

receive a second subset of the set of corresponding redundancy symbols transmitted over a second radio link among said plurality of radio links, distinct from the first radio link save symbols from said second subset in memory;

decode and correct errors on the systematic symbols received by using redundancy symbols of the first subset of the set of corresponding redundancy symbols;

decode and correct the errors on the systematic symbols received by using redundancy symbols of the second subset of corresponding redundancy symbols.

12. A receiving device according to claim 11, wherein the receiving device is further configured to determine whether the systematic symbols require additional correction after decoding and correcting the errors by using redundancy symbols of the first subset of the set of corresponding redundancy symbols, and to trigger the decoding and correction of errors in the systematic symbols received by means of redundancy symbols of the second subset of corresponding redundancy symbols whenever the decoding and correcting of errors on the systematic symbols received by means of redundancy symbols from the first subset of the set of corresponding redundancy symbols.

13. A receiving device according to claim 11, wherein the receiving device is further configured to receive said second subset of redundancy symbols when it is transmitted in broadcast mode.

14. A receiving device according to claim 11 configured to receive data transmitted from a radio communication network infrastructure comprising first and second subsystems, wherein the receiving device is further configured to receive systematic symbols and the first subset of the set of corresponding redundancy symbols transmitted in broadcast mode by the first subsystem, and to receive the second subset of the set of corresponding redundancy symbols transmitted by the second subsystem.

15. A receiving device according to claim 14, wherein the receiving device is further configured to receive systematic symbols and the first subset of the set of corresponding redundancy symbols transmitted in broadcast mode by a broadcast network infrastructure, and to receive the second subset of the set of corresponding redundancy symbols transmitted by a cellular radio communication network infrastructure.

16. A receiving device according to claim 15, wherein the receiving device is further configured to receive systematic symbols and the first subset of the set of corresponding redundancy symbols transmitted in broadcast mode by a DVB-H or DVB-SH multimedia content broadcast network infrastructure, and to receive the second subset of the set of corresponding redundancy symbols transmitted by a cellular radio communication network infrastructure, which is UMTS, WiMAX, CDMA2000 and/or LTE.

17. A receiving device according to claim 14, wherein the receiving device is further configured to receive systematic symbols and the first subset of the set of corresponding redundancy symbols transmitted in broadcast mode by a satellite-based multimedia content broadcast network infrastructure, and to receive the second subset of the set of corresponding redundancy symbols transmitted by a terrestrial multimedia content broadcast network infrastructure.

18. A receiving device according to claim 14, wherein the receiving device is further configured to receive systematic symbols and the first subset of the set of corresponding redundancy symbols transmitted in broadcast mode by a DVB-SH satellite-based multimedia content broadcast network infrastructure, and to receive the second subset of the set of corresponding redundancy symbols transmitted by a DVB-SH terrestrial multimedia content broadcast network infrastructure.

19. A receiving device according to claim 11, wherein the decoding means are further configured to decode data encoded using a Reed-Solomon error correction code.

20. A receiving device according to claim 11, wherein the receiving device is further configured to decode data encoded using a Raptor error correction code.

21. A receiving device according to claim 11 implemented in a radio communication mobile.

22. A radio communication network infrastructure configured to transmit data to a receiving device over a plurality of radio links, said data being organized into sequences of symbols, comprising:
- an encoder configured to encode, according to an error correction coding scheme, data to be transmitted to produce a set of systematic symbols and a set of corresponding redundancy symbols;
- a transmitter configured to transmit, over a first radio link among said plurality of radio links, in broadcast mode, systematic symbols and a first subset of the set of corresponding redundancy symbols;
- wherein the transmitter is further configured to transmit, over a second radio link among said plurality of radio links, distinct from the first radio link, a second subset of the set of corresponding redundancy symbols,
- wherein the radio communication network infrastructure comprises a first and a second subsystem, and the systematic symbols in the first subset of the set of corresponding redundancy symbols are transmitted in broadcast mode to the receiving device by the first subsystem, and the second subset of corresponding redundancy symbols is transmitted by the second subsystem.

23. A radio communication network infrastructure according to claim 22, wherein the transmitter is further configured to transmit, over a second radio link among said plurality of radio links, distinct from the first one, the second subset of the set of the corresponding redundancy symbols in broadcast mode.

24. A radio communication network infrastructure according to claim 22, further comprising a first subsystem comprising the transmitter.

25. A radio communication network infrastructure according to claim 24, wherein the first subsystem further comprises a broadcast network infrastructure and a cellular radio communication network infrastructure.

26. A radio communication network infrastructure according to claim 25, wherein the broadcast network infrastructure is a DVB-H or DVB-SH multimedia content broadcast network infrastructure, and the cellular radio communication network infrastructure is UMTS, WiMAX, CDMA2000 and/or LTE.

27. A radio communication network infrastructure according to claim 24, wherein the first subsystem comprises a satellite-based multimedia content broadcast infrastructure comprising the transmitter, and the second subsystem comprises a terrestrial multimedia content broadcast network infrastructure comprising the second transmission means.

28. A radio communication network infrastructure according to claim 27, wherein the satellite-based multimedia content broadcast infrastructure and the terrestrial multimedia content broadcast network infrastructure are both DVB-SH.

29. A radio communication network infrastructure according to claim 22, wherein the encoder is further configured to carry out data encoding according to a Reed-Solomon error correction code.

30. A radio communication network infrastructure according to claim 22, wherein the encoder is further configured to carry out data encoding according to a Raptor error correction code.

31. A radio communication network infrastructure node configured to transmit data to a receiving device over a plurality of radio links, comprising:
- a receiver configured to receive data to be transmitted organized into a sequence of symbols;
- an encoder configured to encode, according to an error correction coding scheme, data to be transmitted to produce a set of systematic symbols and a set of corresponding redundancy symbols;
- a transmitter configured to transmit to a first radio transmission device of the infrastructure, the systematic symbols and a first subset of the set of corresponding redundancy symbols to be transmitted over a first radio link among said plurality of radio links, in broadcast mode;
- the transmitter being further configured to transmit to a second radio transmission device of the infrastructure a second subset of the set of corresponding redundancy symbols to be transmitted over a second radio link among said plurality of radio links, distinct from the first one
- wherein the radio communication network infrastructure comprises a first and a second subsystem, and the systematic symbols in the first subset of the set of corresponding redundancy symbols are transmitted in broadcast mode to the receiving device by the first subsystem, and the second subset of corresponding redundancy symbols is transmitted by the second subsystem.

32. An infrastructure node according to claim 31 implemented in a DVB-H IP encapsulator node.

33. An infrastructure node according to claim 31 implemented in a DVB-SH Network Head End node.

34. A method according to claim 1 implemented as a computer program, which may be loaded into a memory associated with a processor, and comprising instructions for implementing the method when said program is executed by the processor.

35. A method according to claim 34 wherein the program is recorded on a data-processing medium.

* * * * *